Nov. 12, 1963      L. HIRSCH      3,110,361

WHEEL CHOCK APPARATUS FOR CARRYING MOTOR CARS

Filed Aug. 29, 1962

INVENTOR
LEO HIRSCH

BY    *Jacob r. Oshuff*,

ATTORNEYS

United States Patent Office 3,110,361
Patented Nov. 12, 1963

3,110,361
WHEEL CHOCK APPARATUS FOR CARRYING MOTOR CARS
Leo Hirsch, 1624 Dufossat St., New Orleans, La.
Filed Aug. 29, 1962, Ser. No. 220,252
2 Claims. (Cl. 188—32)

This invention relates to an apparatus for loading, carrying, and unloading motor cars on railway flat cars.

The present invention is particularly applicable for moving automobiles from one geographic location to another. More particularly, it is intended to be used by an individual, such as a salesman, who desires to travel from one location to another location. This invention is directed to means to permit driving an automobile onto a flat car, with the latter containing means to retain the automobile in position during shipment. The driver of the car, or perhaps an attendant, can drive the car onto a suitable flat car, as hereinafter pointed out, and the driver can be transported along with the vehicle by using the normal passenger facilities of the train. Upon arrival at the destination, the driver can then drive his car from the flat car onto a loading platform and then onto the road.

Of course, it is apparent that the invention can be used for the transportation of new and/or used cars, with or without drivers.

The invention renders it possible to ship automobiles in large quantities by rail. By way of example, the invention contemplates the use of trains comprising a plurality of flat cars, which may be twenty-five or more in number. The flat cars are specifically modified or constructed as described hereinafter.

An object of the present invention is to provide an improved means for shipment of automobiles by rail.

Another object is to provide means for rapidly loading automobiles onto and removing them from a flat car, and vice versa.

Another object of the present invention is to provide positioning and anchoring means for holding automobiles in place on railway flat cars, so that they may be shipped by rail faster, on more certain time schedules, with a minimum of possibility of damage in transit, perhaps at a lower cost, and will arrive at their destinations quickly in good condition.

An additional object of the present invention is to provide railway flat cars with positioning and anchoring means for carrying automobiles, which particularly adapt the flat cars to the quick loading, the safe carrying, and the quick unloading of the automobiles.

Still other objects, advantages and improvements will become apparent from the following specification, taken in connection with the accompanying drawings, in which.

Figure 1:
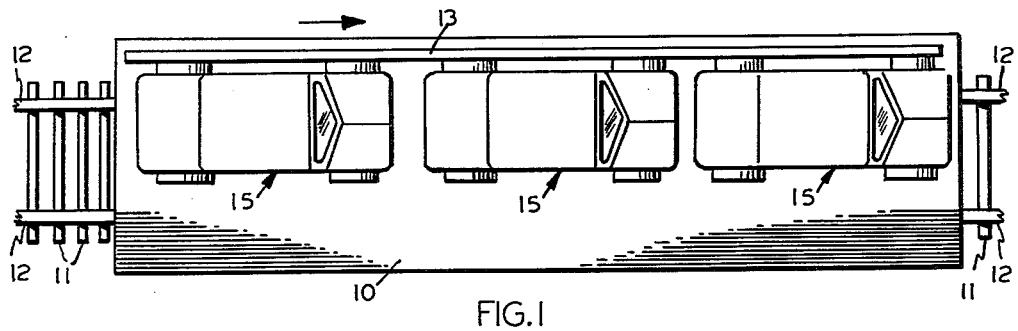
FIGURE 1 is a top plan view of a railway flat car showing several automobiles thereon and held in place by positioning and anchoring means according to the present invention.
Figure 2:
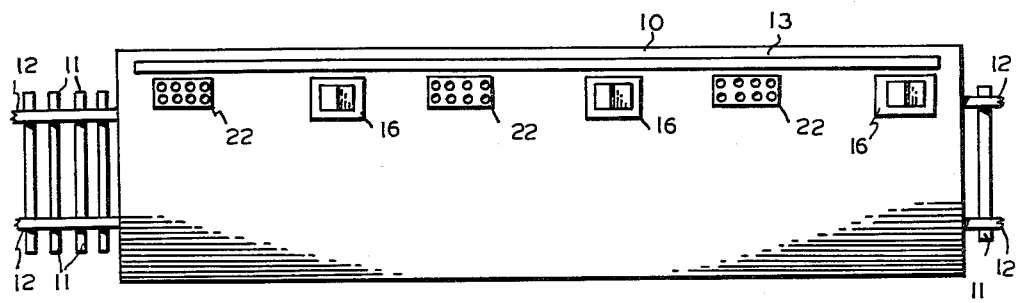
FIGURE 2 is a view similar to FIGURE 1, but without the automobiles in place on the flat cars and showing the positioning and anchoring means according to the present invention.
Figure 4:
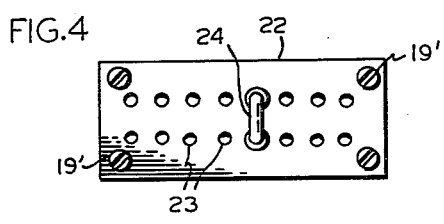
FIGURE 4 is a top plan view of the mounting plate of the complementary selectively adjustable anchoring device according to the present invention.

Referring now to the drawings in detail, and to FIGURES 1 and 2 in particular, there is here shown at 10 a railway flat car according to the present invention which, of course, is drawn over a track comprised by rails 12 and cross-ties 11. Along one side of the top of the flat car there is positioned a guide rail 13, which is mounted on uprights (not shown) and positioned at approximately the height of the bumper on a conventional automobile above the ground, or possibly slightly lower. The automobiles, three here being shown, are designated generally by the reference numeral 15, are assumed to be driven onto the flat car from the right and are driven along the left side of the flat car along the guide rail 13, as shown by the arrow.

Figure 3:
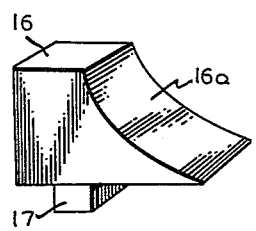
FIGURE 3 is a perspective view of a fixed anchoring device according to the present invention.
Figure 7:
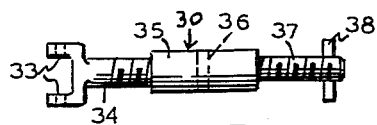
FIGURE 7 is a top plan view of the adjusting component of the adjustable anchoring device of FIGURE 6.

The fixed chock 16 is shown in FIGURE 3. This chock is used ahead of the left front wheels. In the illustrated form, the chock 16 is comprised by a rectangular parallel piped block having a cutaway surface on the arc of a circle extending from about the transverse center line of the top to one corner to provide an arcuate surface 16a to conform approximately to the radius of the conventional automobile tire, when inflated. Along the bottom of the chock 16 there is a transversely positioned lug 17. When the chock is made of metal, the lug 17 will be integrally formed thereon; when the chock is made of wood, the lug 17 will be a separate strip and secured to same by nails or screws.

Suitable rectangular holes may be formed at spaced intervals longitudinally of the floor of the flat car 10 for reception of the lugs 17 on the chocks, but preferably plates mounted flush, similar to the plates 18, in FIGURE 6, to be later described, are secured at the spaced intervals along the floor of the flat car by lag screws 19. There are preferably four or five of these plates aligned longitudinally of the flat car. Each plate has a transversely positioned rectangular hole 20 therein for the reception of the lug 17 on the bottom of the fixed chock 16.

Figure 6:
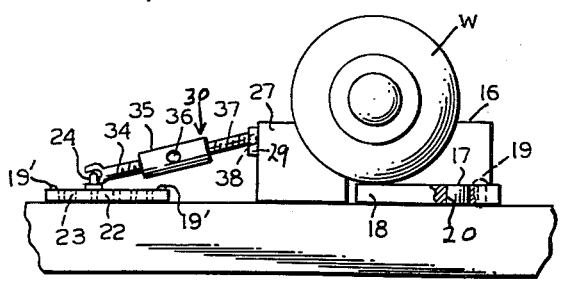
FIGURE 6 is a side elevational view of the fixed anchoring device shown in FIGURE 3 and the complementary adjustable anchoring device.

The complementary selectively adjustable chock 27, as shown in FIGURE 6, is slidable on the floor or deck of the flat car. Several of these adjustable chocks are provided, and each is mounted on the flat car by means of a mounting plate 22, there being one chock 27 for each mounting plate 22. A plurality of mounting plates 22 is provided at suitably spaced intervals longitudinally of the floor of the flat car adjacent the guide rail, the plates 22 alternating with fixed chocks 16, as shown in FIGURE 2.

Figure 5:
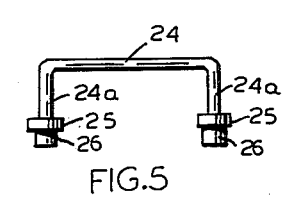
FIGURE 5 is a front, or rear, elevational view of the removable yoke of the selectively adjustable anchoring device according to FIGURE 4.

The mounting plates 22 are secured to the floor of the flat car by lag screws 19'. Plate 22 has two parallel longitudinal rows of holes 23 therein. For each plate 22 there is provided a yoke 24 (see FIGURE 5), which is a metal rod and has downwardly depending parallel legs 24a. At spaced locations above the lower end of the legs 24a there are mounted collars or flanges 25, which may be welded to the legs or secured thereto by transversely positioned pins (not shown).

The yoke 24 is used by inserting the lower extremities of the legs 24a into corresponding holes 23 of the mounting plate 22. In order to provide more rigid support for the legs 24a in the holes 23, the lower extremities of the legs are provided with slightly tapered sleeves 26 force fitted over the lower ends of the legs below the flanges 25. It is apparent that yoke 24 can be mounted in any pair of holes 23 to adjust the spacing of the yoke.

In order to provide means for sliding the adjustable chock 27 against the wheel W to firmly secure the wheel between the chocks 16 and 27, a turnbuckle 30 is mounted between the yoke 24 and the adjustable chock 27. The turnbuckle includes a rod 34 terminating in a U-shaped member 33 which can be hooked or positioned against the horizontal portion of yoke 24 to prevent rearward movement of the rod 34. A complementary rod is pivotally mounted against the rear face of chock 27 by means of pin 38 which passes through ears or lugs 29 and rod 37, the ears being fixed to the rear face of chock 27. The inner ends of rods 34 and 37 are threaded in opposite directions, and their threads are threadedly engaged in sleeve or nut 35 to form a turnbuckle. The sleeve 35 has a hole 36 therethrough in which a rod can be inserted to tighten the turnbuckle.

The automobile is driven onto the flat car, so that the left front wheel abuts the arcuate surface of fixed chock 16. The yoke 24 is then placed in an appropriate set of holes 23, the turnbuckle and the adjustable chock 27 are placed in position, and the turnbuckle is tightened. The adjustable chock 27 also has an arcuate surface which conforms with the shape of the tire.

Having now fully described my invention, what I claim as new and useful and desire to secure by Letters Patent of The United States is:

1. An anchoring device for holding automobiles on a railroad flatcar which comprises: a supporting plate; means for fastening said plate to the floor of a flatcar, said plate having therein a plurality of transverse holes; an inverted, U-shaped yoke member having a pair of leg portions connected by a bearing portion, said leg portions being of circular cross-sectional design, the free ends of said leg portions being adapted to be slidably received within said holes; a chock having an arcuate surface for engagement with a wheel of a vehicle; and a turnbuckle having first and second rod portions extending outwardly in opposite directions therefrom, the outwardly extending end of said first rod portion being pivotally affixed to said chock at a point immediately adjacent to the upper surface thereof, the outwardly extending end of said second rod portion being adapted to removably engage said bearing portion of said yoke, whereby upon tightening of said turnbuckle said rod portions are placed in compression, said legs of said yoke are forced downwardly within said holes, and the portion of said arcuate surface immediately adjacent to the upper surface of said chock is forced into tight engagement with the rim of said wheel.

2. In an anchoring device for holding automobiles on a railroad flatcar as described in claim 1, wherein there is provided a second chock, means for mounting said second chock onto the floor of said flatcar, said second chock having an arcuate surface opposed to the arcuate surface of said first chock for reception therebetween of said wheel of a vehicle.

References Cited in the file of this patent

UNITED STATES PATENTS

| | | |
|---|---|---|
| 2,023,971 | Otis | Dec. 10, 1935 |
| 2,521,088 | Phelps | Sept. 5, 1950 |
| 2,771,162 | Marsh | Nov. 20, 1956 |
| 2,788,751 | Russell | Apr. 16, 1957 |
| 2,835,349 | Veselik | May 20, 1958 |
| 2,963,991 | Schueder et al. | Dec. 13, 1960 |
| 3,004,500 | Johnson | Oct. 17, 1961 |
| 3,017,646 | Kelley | Jan. 23, 1962 |
| 3,023,711 | Rolfe | Mar. 6, 1962 |
| 3,031,701 | Fenton | May 1, 1962 |

FOREIGN PATENTS

| | | |
|---|---|---|
| 1,066 | Great Britain | Jan. 15, 1896 |